No. 785,461. PATENTED MAR. 21, 1905.
H. P. WILSON.
MACHINE FOR FORMING WIRE LOOPS.
APPLICATION FILED MAY 28, 1904.

8 SHEETS—SHEET 1.

WITNESSES:

INVENTOR
Henry P. Wilson
BY
ATTORNEYS

No. 785,461. PATENTED MAR. 21, 1905.
H. P. WILSON.
MACHINE FOR FORMING WIRE LOOPS.
APPLICATION FILED MAY 28, 1904.

8 SHEETS—SHEET 3.

WITNESSES:
INVENTOR
Henry P. Wilson
BY
ATTORNEYS

No. 785,461. PATENTED MAR. 21, 1905.
H. P. WILSON.
MACHINE FOR FORMING WIRE LOOPS.
APPLICATION FILED MAY 28, 1904.

8 SHEETS—SHEET 4.

WITNESSES:
INVENTOR
Henry P. Wilson
BY
ATTORNEYS

No. 785,461. PATENTED MAR. 21, 1905.
H. P. WILSON.
MACHINE FOR FORMING WIRE LOOPS.
APPLICATION FILED MAY 28, 1904.
8 SHEETS—SHEET 5.
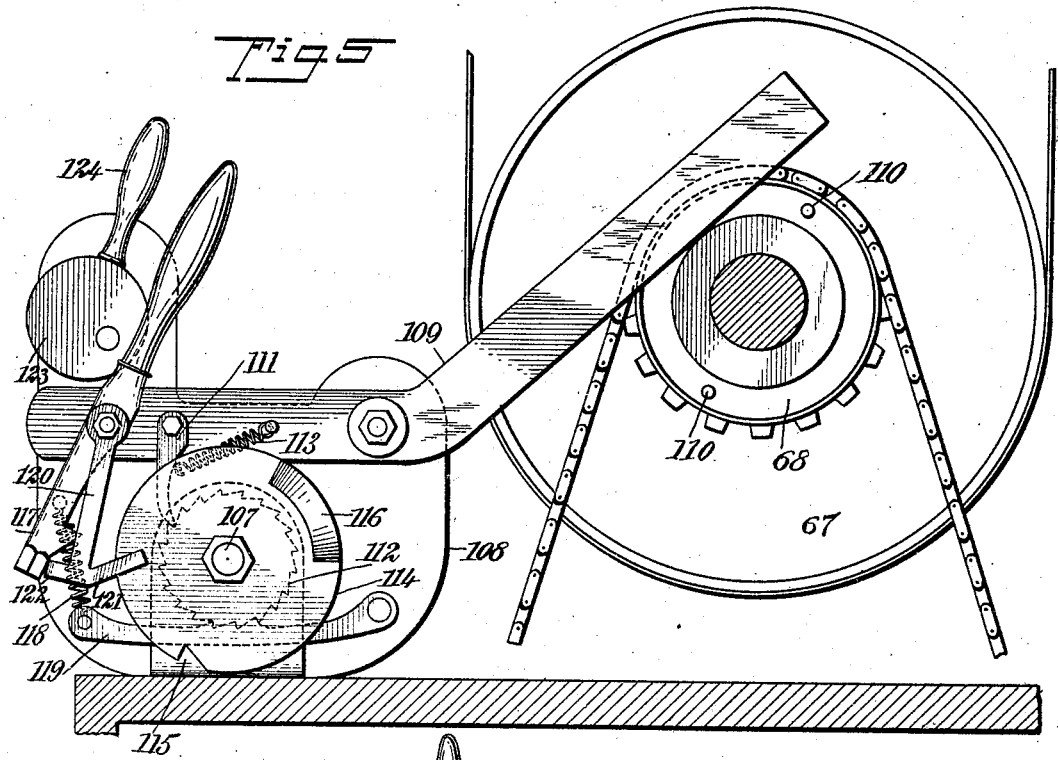
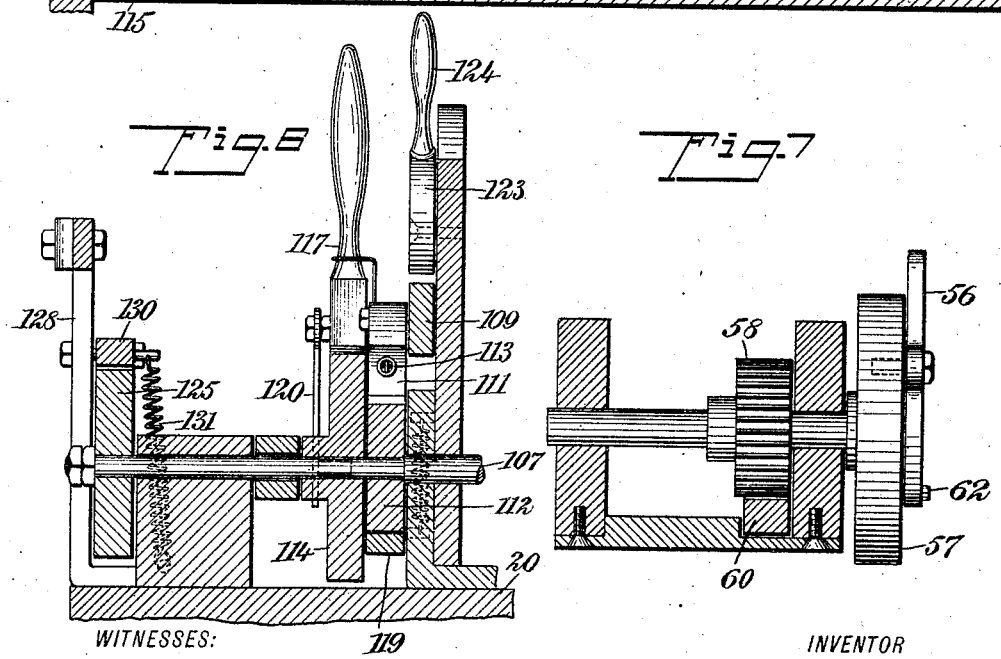
WITNESSES:
J. A. Brophy
C. R. Ferguson
INVENTOR
Henry P. Wilson
BY
ATTORNEYS

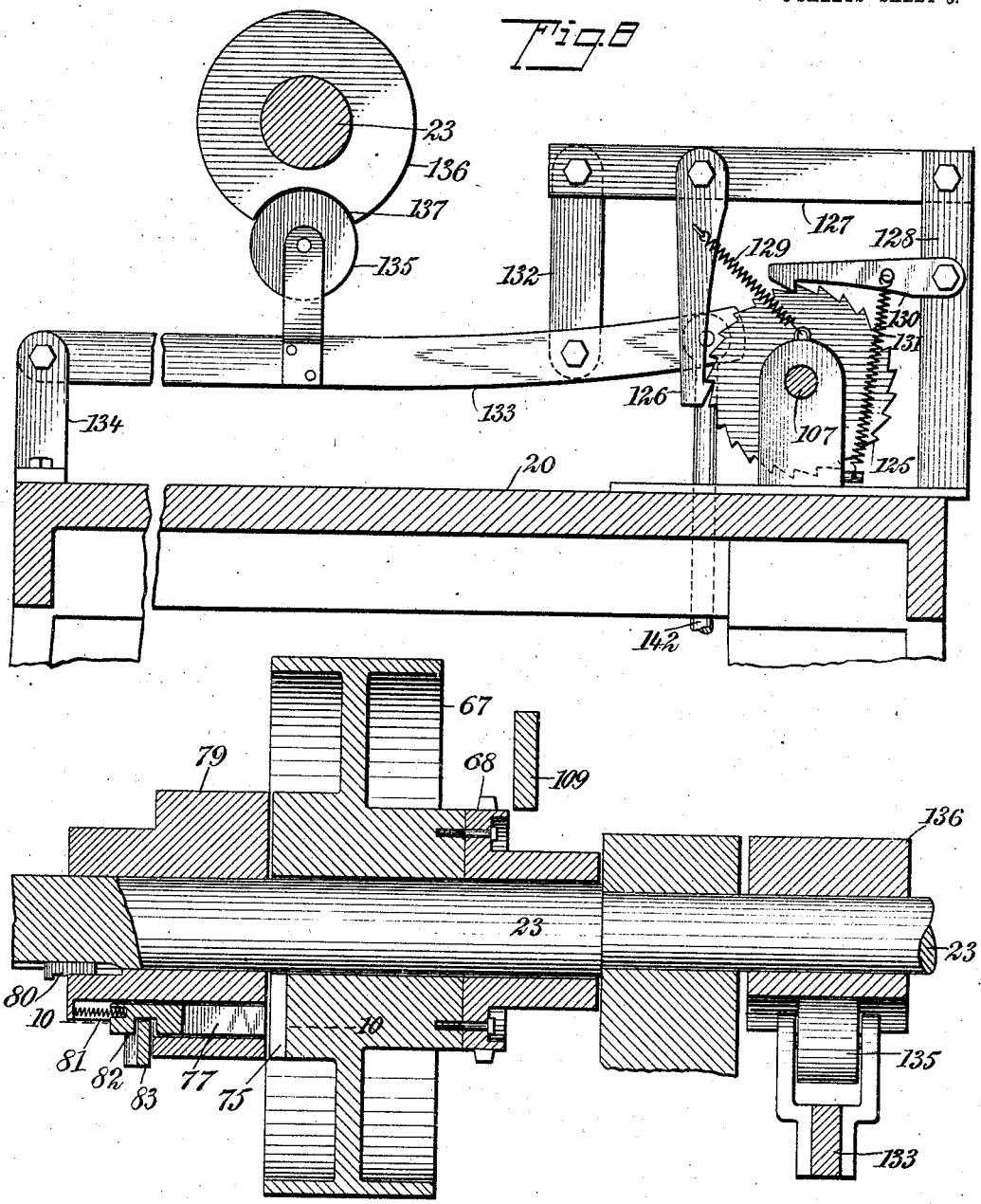

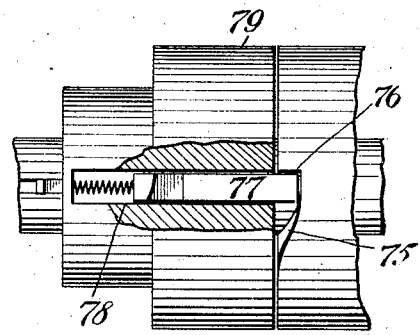
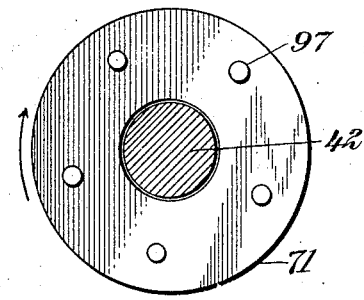
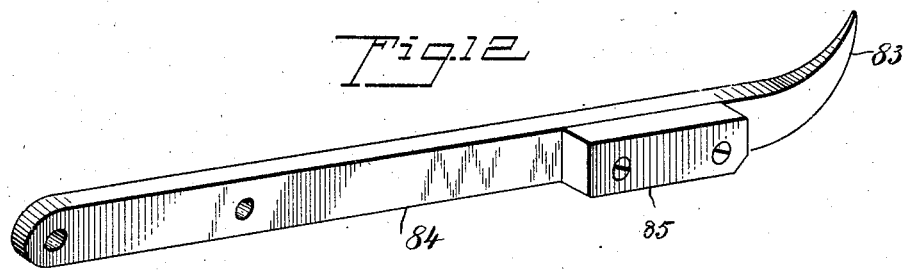
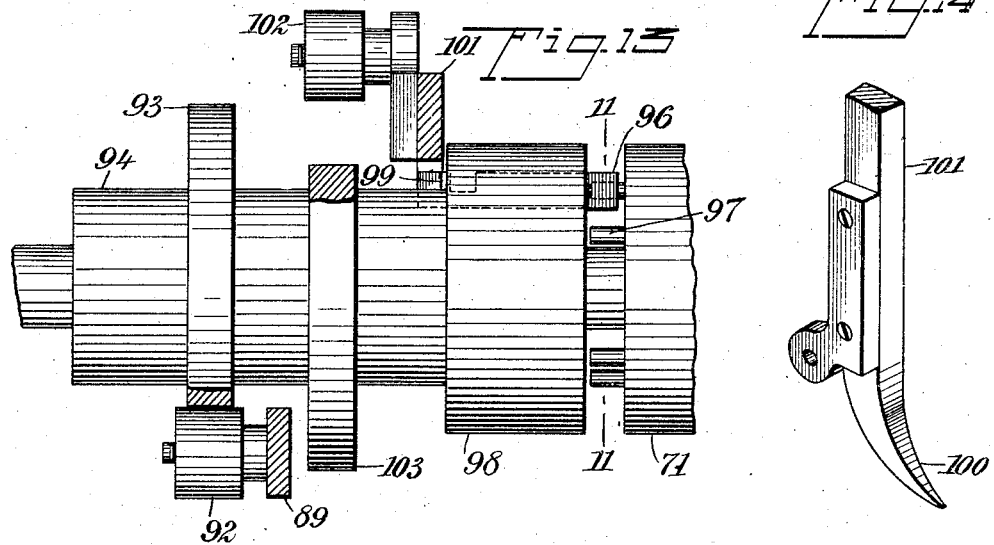

No. 785,461. PATENTED MAR. 21, 1905.
H. P. WILSON.
MACHINE FOR FORMING WIRE LOOPS.
APPLICATION FILED MAY 28, 1904.

8 SHEETS—SHEET 8.

WITNESSES:
J. J. Brophy
C. R. Ferguson

INVENTOR
Henry P. Wilson
BY
ATTORNEYS

No. 785,461.  Patented March 21, 1905.

UNITED STATES PATENT OFFICE.

HENRY P. WILSON, OF NEW YORK, N. Y.

MACHINE FOR FORMING WIRE LOOPS.

SPECIFICATION forming part of Letters Patent No. 785,461, dated March 21, 1905.

Application filed May 28, 1904. Serial No. 210,176.

*To all whom it may concern:*

Be it known that I, HENRY P. WILSON, a citizen of the United States, and a resident of the city of New York, borough of Manhattan, in the county and State of New York, have invented a new and Improved Machine for Forming Wire Loops, of which the following is a full, clear, and exact description.

This invention relates to improvements in machines for forming loops or eyes on the ends of wires—such, for instance, as wire baleties—an object being to provide a machine of this character by means of which the loops on wire ends may be rapidly formed and having means for automatically stopping the machine after forming the loops on a predetermined number of wires to form a bundle.

Other objects of the invention will appear in the general description.

I will describe a machine for forming wire loops embodying my invention and then point out the novel features in the appended claims.

Reference is to be had to the accompanying drawings, forming a part of this specification, in which similar characters of reference indicate corresponding parts in all the figures.

Figure 1:
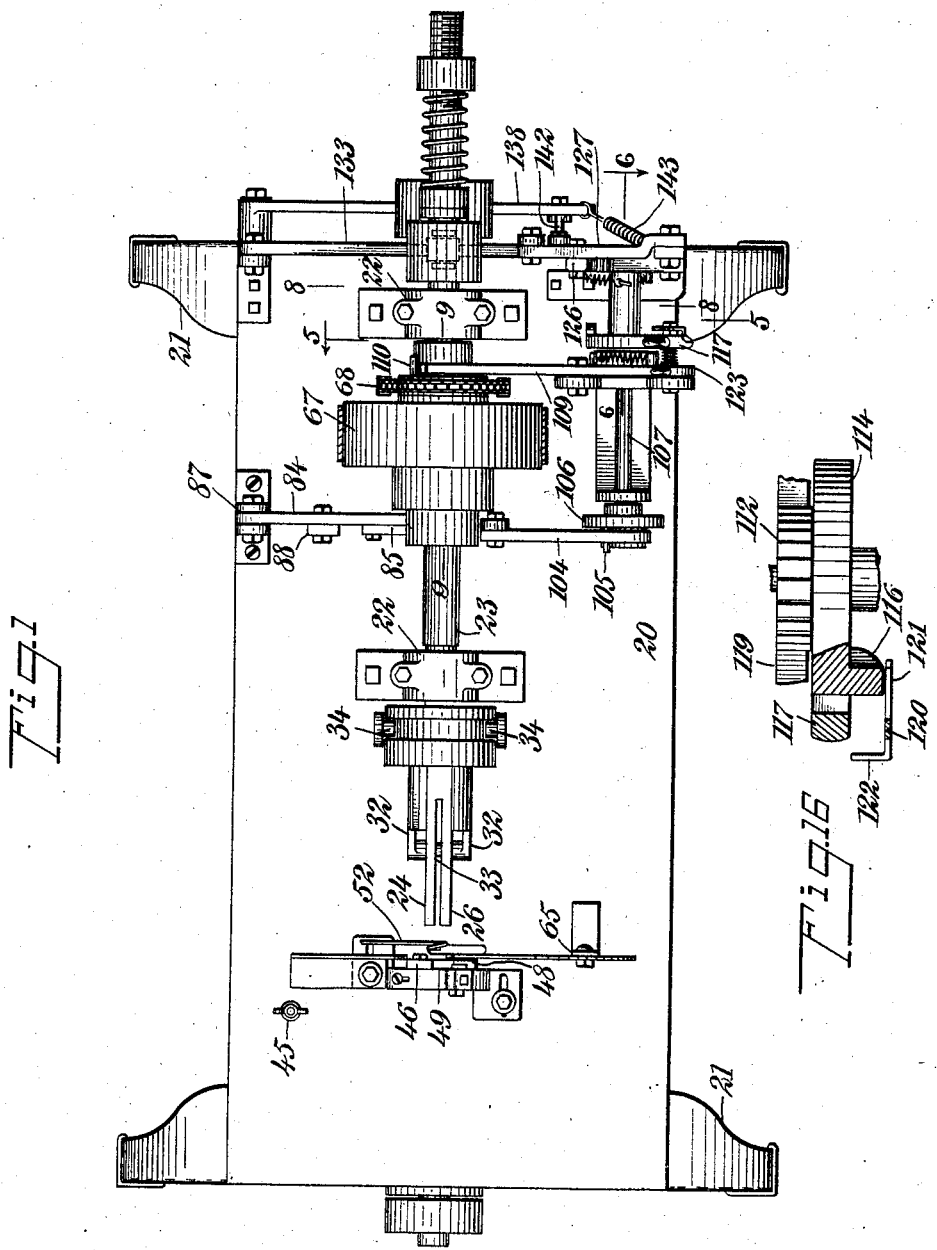
Figure 2:
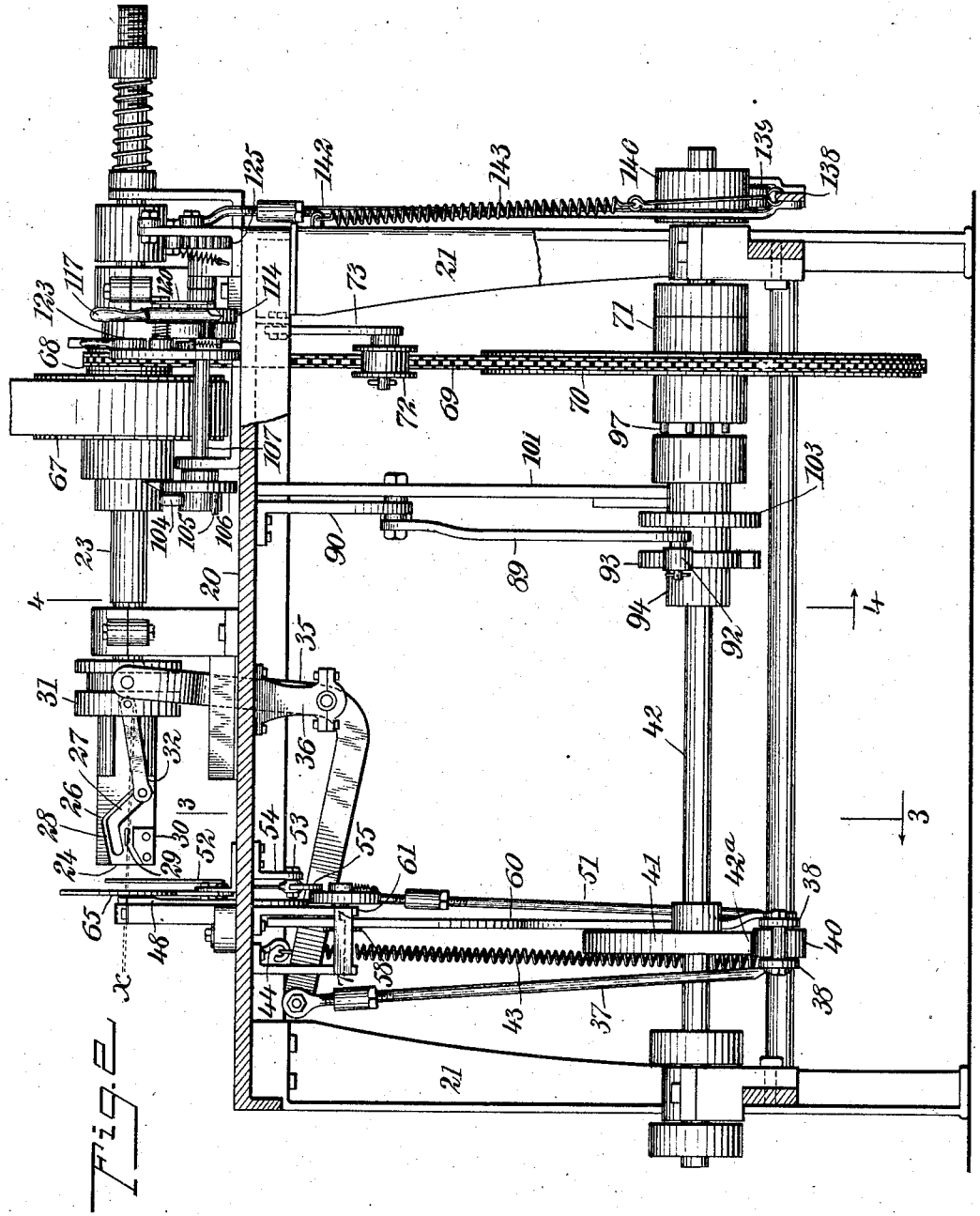
Figure 3:
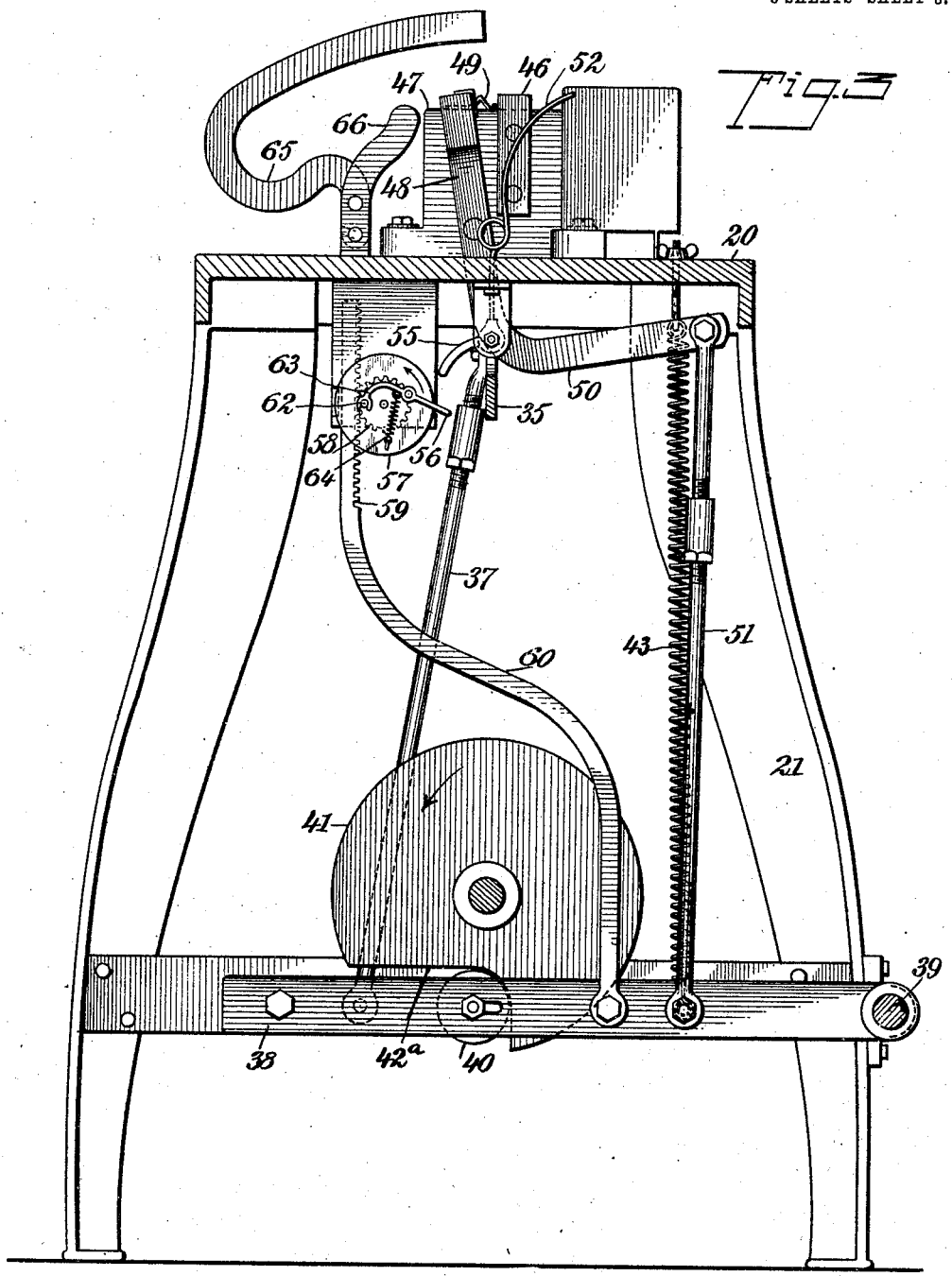
Figure 15:
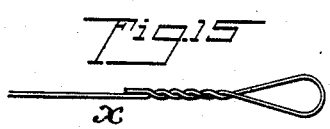
Figure 4:
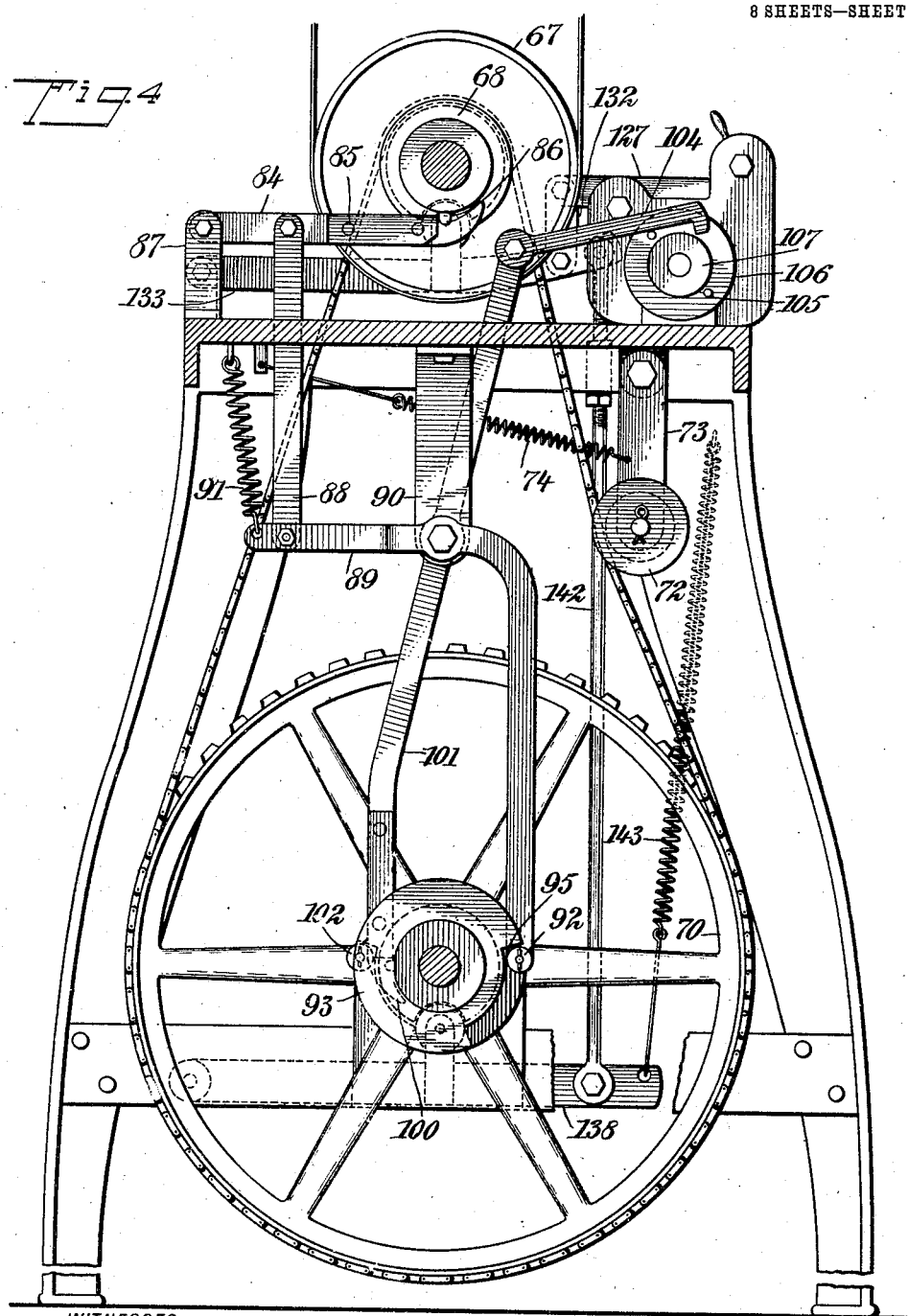
Figure 17:
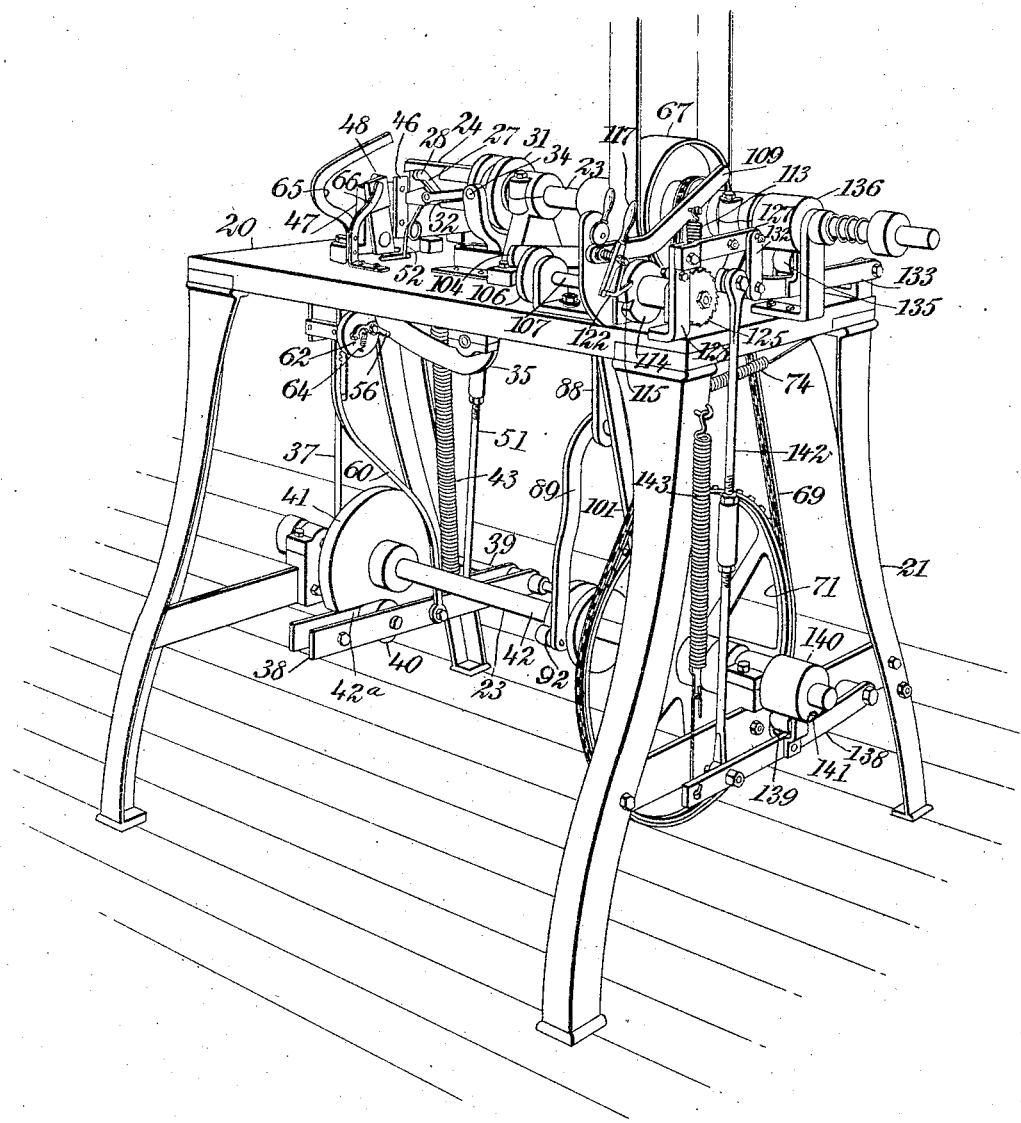

Figure 1 is a plan view of a loop-forming machine embodying my invention. Fig. 2 is a sectional elevation thereof. Fig. 3 is a section on the line 3 3 of Fig. 2. Fig. 4 is a section on the line 4 4 of Fig. 2. Fig. 5 is a section on the line 5 5 of Fig. 1. Fig. 6 is a section on the line 6 6 of Fig. 1. Fig. 7 is a section on the line 7 7 of Fig. 2. Fig. 8 is a section on the line 8 8 of Fig. 1. Fig. 9 is a section on the line 9 9 of Fig. 1. Fig. 10 is a section on the line 10 10 of Fig. 9. Fig. 11 is a section on the line 11 11 of Fig. 13. Fig. 12 is a perspective view of a clutch-shifting blade employed. Fig. 13 is a plan view of the clutch. Fig. 14 is a perspective view of another clutch-shifting blade employed. Fig. 15 shows one of the wires as formed in the machine. Fig. 16 is a detail showing a stop mechanism employed, said figure being partly in section and partly in plan; and Fig. 17 is a perspective view of the complete machine.

Referring to the drawings, 20 designates the table or bed-plate of the machine supported on suitable legs 21. Having bearings in standards 22 on the bed-plate is a main shaft 23, on the forward end of which is a bending and twisting head, consisting of a side plate 24, spaced from the upper edge of which is a finger 26, and the plate is provided with a cam-slot having downwardly opposite inclined portions 27 28. Arranged below the portion 28 of the cam-slot and projected laterally on the plate 24 is a lug 29, and below the lug and attached to the plate is a block 30. The wire, as will be hereinafter described, is to be passed between the lug and the block.

Movable lengthwise of the shaft and adapted to rotate therewith is a sleeve 31, from which arms 32 extend forward, and at the forward ends of these arms is a cross-pin 33, which passes through the cam-slot and is designed to form the loop or bend in the wire. The sleeve 31 is provided with an annular channel in which lugs 34, carried by the arms of a shifting lever 35, engage. This shifting lever 35 is mounted to swing in a hanger 36, secured to the lower side of the bed-plate 20, and from the end of the horizontally-disposed section of this shifting lever an actuating-rod 37 extends downward, and at its lower end this rod 37 has pivotal connection with one of two arms 38, mounted to swing on a rod 39 at the rear portion of the machine.

Carried by the arms 38 is a roller 40, engaging with a cam-wheel 41, mounted on a driving-shaft 42. The greater portion of the periphery of this wheel 41 is concentric with its axis. At one side, however, there is a recess or depression $42^a$, through which the roller 40 passes, as will be hereinafter described. The arms are held yieldingly upward by means of a spring 43, connected to one of the arms 38, and at its upper end it has connection with the bed-plate 20. As here shown, the upper end of the spring is connected to a hook 44, which passes up through an opening in the bed-plate, and its threaded end is engaged by an adjusting thumb-nut 45. By this arrangement the tension of the spring may be regulated.

Forward of the bending and twisting head or mechanism is a wire-clamping device consisting of a fixed jaw 46, secured to an upright 47, and mounted to swing on the upright is a movable jaw 48. The wire when first placed in the machine is caused to move against the fixed jaw by means of an inclined plate 49, secured to the upper edge of the upright 47. The lower portion of the movable jaw 48 passes through a slot formed in the bed-plate 20, and underneath the bed-plate the jaw has a horizontally-disposed portion 50, from which a rod 51 extends downward to a connection with one of the arms 38. This rod 51, as here shown, is made in two sections connected by an interiorly-threaded sleeve, so that the length of the rod may be adjusted to regulate the movement of the jaw 48.

Arranged to swing transversely of the machine between the clamping devices and the bending and twisting head is an ejector, consisting of a yielding wire 52, this wire being longitudinally curved and extended downward through a slot in the bed-plate 20, and at its lower end the ejector is attached to a stud 53, supported on a hanger 54, secured to the under side of the bed-plate, and extended at an outward and downward curve from the lower end of the ejector is a tappet-finger 55, designed to be engaged by a tappet-arm 56, pivoted to swing on a wheel 57, on the shaft of which is a pinion 58, meshing with a rack 59, formed on an actuating-rod 60, extended downward and connected to one of the arms 38. The shaft of the wheel 57 has its bearings in a plate 61, and on the face of the wheel is a pin 62, designed to engage against the curved end 63 of the tappet-arm 56, and the said curved end is held yieldingly in engagement with said pin by means of a spring 64, attached at one end to the wheel and at the other end to the tappet-arm. When the tappet-arm moves in one direction—that is, in the direction caused by the downward movement of the rod 60—said tappet-arm will engage with the tappet-finger 55; but owing to its method of connection to the wheel 57 the said tappet-arm will swing to permit it to pass the said finger, and therefore no motion will be imparted to the ejector. Upon the reverse movement, however, the curved end will come in contact with the pin 62, and then as the tappet-arm strikes against the upper side of the tappet-finger the ejector will be forced quickly forward and discharge a formed or completed wire into a suitable receiver.

The receiver consists of a bar of metal curved downward and outward to form a receiving-pocket 65, and thence the upper end is carried upward and inward, terminating at a point over the wire-clamping device. Below this said projection is an upward projection 66, which forms another wall of the pocket. It may be here stated that after discharging a predetermined number of finished wires into the receiver—say, for instance, twenty-five (25)—the machine comes to a stop, and these twenty-five wires are to be removed from the receiver and suitably bound together.

Loosely mounted on the shaft 23 is a driving-pulley 67, and attached to said pulley, and consequently loose on the shaft, is a sprocket-pinion 68, from which a chain 69 passes downward and connects with a sprocket-wheel 70, the hub portion 71 of which is loosely mounted on the guiding-shaft 42. The chain 69 is kept under proper tension by means of a grooved roller 72, carried by a swinging arm 73, from which a spring 74 passes to a connection with the rear portion of the machine. This spring of course will hold the roller 72 yieldingly against the chain. The hub of the pulley 67 at one side is provided with a notch 75, which has an inclined or curved wall at one end, and at the opposite end is a shoulder 76 for engaging with a clutch-pin 77, movable in a longitudinal opening 78, formed in a collar 79, mounted to move longitudinally on the shaft 23, but rotating therewith. As here shown, a key 80 engages in channels formed in the interior of the sleeve and in the shaft. The pin 77 is moved yieldingly inward by means of a spring 81, and the pin is provided with a notch 82 for receiving the curved knife-like end 83 of a shifting arm 84. The curved end 83 of the shifting device is not only curved widthwise, but it is curved laterally, as clearly shown in Fig. 9, so as to pass freely into the notch 82 when the clutch-pin is in its innermost position, and when in this position it will be understood that a portion of the notch will be outward of the end of the sleeve, permitting the blade 83 to engage therein, and it will be noted in Fig. 10 that the outer end wall of the pin 77 is slightly cam-shaped.

Secured to one end of the arm or lever 84 is a stop-block 85, which will engage with a lug 86, carried by the clutch-member collar 79, and stop said collar and the shaft at the proper time after disengaging the clutch-pin 77 from the pulley 67.

The shifting arm 84 is mounted to swing on an upright 87, attached to the bed-plate, and from this arm a link 88 extends downward through an opening in the bed-plate and connects at its lower end with a horizontally-disposed portion of an angle-lever 89, mounted to swing on a hanger 90, and the horizontally-disposed portion is held yieldingly upward by means of a spring 91, attached at one end to said portion and at the other end to the bed-plate. The lower end of the lever 89 is provided with a roller 92, engaging with a cam-flange 93, formed on a hub 94, attached to the shaft 42. At one side this flange is cut away for about one-fourth of its diameter, as indicated at 95. The end walls of this cut-away portion form shoulders for engaging with the roller 92 to cause a movement of the lever 89. The hub or sleeve 94 carries a clutch-pin 96, designed to engage with any one of a series of clutch-pins 97, formed on the hub 71 of the sprocket-wheel 70. This clutch-pin is movable in a longitudinal opening formed in the enlarged portion 98 of said hub or sleeve, and it is similar to the clutch-pin 77 first described—that is, it is moved outward by means of a spring—and it is provided with a notch 99 for receiving a curved or pointed knife end 100 of an actuating-lever 101, which carries a pulley 102 for engaging with a cam-flange 103 on said hub or sleeve 94, this flange 103 being provided at one side with a peripheral recess or depression similar to the recess or depression formed in the flange 93. The lever 101 is mounted to swing on the hanger 90, and its upper end projects through an opening in the bed-plate of the machine, and from this upper end a swinging link 104 extends rearward and is designed to be engaged by either one of opposite pins 105, extended outward from a disk 106, mounted on a shaft 107, and by this construction there will be two operations of the lever 101 upon each complete revolution of the disk 106 to move the knife-point 100 out of engagement with the clutch-pin, permitting such clutch-pin to engage with one of the pins 97, and the blade will be held out of its engagement with the clutch-pin by means of the roller 102, moving on the greater diameter of the flange 103. When the depression, however, in the periphery of the flange reaches the roller 102, the knife-blade will be forced inward to engage and draw out the clutch-pin 96, permitting the sprocket-wheel to continue moving, while the shaft 42 remains idle.

I will now describe the means for automatically stopping the machine after a certain number of wires—say twenty-five (25)—shall have been formed. Mounted to swing on an upwardly-extended plate 108 is a lever 109, having upwardly and rearwardly inclined portions adapted to be engaged by either one of opposite pins 110, extended outward from the face of the sprocket 68. Mounted on the horizontally-disposed portion of this lever 109 is a pawl 111, which is held yieldingly against the teeth of a ratchet-wheel 112 by means of a spring 113. On the shaft of the ratchet-wheel is a disk 114, having a peripheral notch 115 at one side, and opposite this notch on the face of the disk is a cam-block 116, which is reduced in projection from its center outward in both directions. Mounted to swing on the horizontally-disposed portion of the lever 109 is a pawl-lever 117, designed to engage its lower end in the notch 115 to bring the machine to a stop, and the lever is caused to move in the direction of the disk by means of a spring 118, connected at one end to said pawl-lever and at the other end with a toothed rod 119, which engages with the teeth of the ratchet-wheel 112 and prevents back movement thereof. At one end this rod 119 is pivoted to the plate 108.

Rigidly connected to the pin on which the lever 117 is mounted to swing is a downwardly-extended detent-arm 120, having a rearwardly-extended finger 121, designed to be engaged by a cam 116 and extended forward and into the line of movement of the lever 117, the said detent carrying a finger 122. It will be noted that the ratchet-wheel 112 has twenty teeth, and therefore twenty step-by-step motions will be imparted to the disk 114, and when the cam 116 reaches the finger 121 it will force the detent out of engagement with the lever 117, permitting the said lever to swing its lower end against the periphery of the disk. When the end of the lever moves into the notch 115, the upwardly and rearwardly inclined portion of the lever 109 will move out of the line of movement of the pins 110, and at this time the parts will be in such position that the parts for operating the cam-pins will move the cam-pins out, thus permitting the wheels 67 and 70 to run free.

It may be necessary at times to stop the operation of the machine before the predetermined number of wires shall have been formed. Therefore I provide a means for throwing the lever 109 out of the line of movement of the pins 110. This means, as here shown, consists of an eccentric 123, mounted on the plate 108 and having a handle 124, by means of which the eccentric may be turned to engage the outer end of said lever 109, moving the inner end upward. As before stated, the machine as here shown is designed to turn out twenty-five (25) finished wires and then stop to be reset for further operation, which is done, of course, by moving the upper end of the lever 117 inward to engage its lower end with the finger 122. It may be here stated also that before the end of the lever 117 engages in the stop-notch 115 the said lever will have a short engagement on the periphery of the disk 114. For instance, the cam 116 is so related to the notch 115 that the finger 122 will be forced out of engagement with the lever 117, permitting it to drop against the periphery of the disk when the number of wires corresponding to the number of the teeth on the ratchet-wheel 112 is formed, and it will be understood that there are twenty teeth on this wheel. The disk will be kept in further rotation, however, by what I term the "counting mechanism," now to be described, and which has connection with the shaft 107, on which the disk is mounted. This means consists of a ratchet-wheel 125, mounted on said shaft 107 and having twenty-five teeth, that being the number of completed wires to be turned out and bundled before commencing another bundle. The wheel 125 is engaged by a pawl 126, having swinging connection with an arm 127, mounted to swing on a standard 128, the pawl being held yieldingly in connection with the ratchet-wheel by means of a spring 129, and the wheel is prevented from backward movement by means of a dog 130, pivoted to the standard 128 and held yieldingly in connection with the ratchet-wheel by means of spring 131. The swinging arm 127 has a link connection 132 with a rocker or swinging arm 133, pivotally connected to a post 134 on the bed-plate, and this arm 133 carries a roller 135, engaging with a roller 136, the greater portion of the periphery of which is concentric with the axis; but at one side the roller 136 has a notch 137, into which the roller 135 may pass, as will be hereinafter described. This roller 136 is mounted on the shaft 23. Mounted at the lower portion of the machine-frame is another rocker-arm, 138, carrying a roller 139, engaging with a roller 140, attached to the shaft 42, and this roller 140 is provided with a notch 141, and it may be here stated that the notches of the rollers 136 and 140 are at all times in the same relation to each other and that when the rollers 136 140 run free on the rollers 135 139 the pawl 126 will be moved downward, while the wheel 125 remains stationary. When the rollers 135 139 pass into the notches of the rollers above them, the rocker-arms 133 138 will be moved upward, and consequently the pawl 126 will be operated to move the ratchet-wheel one step.

The rocker-arms are caused to move in unison by means of a connecting-rod 142, and they are forced upward by means of a spring 143, connected at one end to the lower rocker-arm and at the other end to a leg of the machine.

The notched rollers and the rollers coacting therewith cause an equalization of the movements of the machine mechanism—that is, all the elements are in proper position, so that a new rod may be inserted while the shaft 23 is at a standstill, and after such insertion the machine will be started, first, to bend the end of the wire $x$ over the lug 29, engaging the free end between the clamping-jaws, the body portion of the wire of course being between the said jaws. Then the clutches will be thrown into engagement with the parts 67 and 71, causing a forward movement of the pin 33 to bend the wires before mentioned, and then the parts will come to such position as to set the shaft 23 in rotation to impart about five twists to the wire.

Having thus described my invention, I claim as new and desire to secure by Letters Patent—

1. In a wire-loop-forming machine, a bending and twisting mechanism, and automatic means for stopping the machine after forming a predetermined number of loops.

2. A wire-loop-forming machine comprising a bending and twisting mechanism, a clamping device forward thereof consisting of a fixed jaw and a movable jaw, and an inclined plate for directing a wire to the fixed jaw.

3. In a wire-loop-forming machine, a bending and twisting mechanism, a clamping device forward thereof, and an ejector consisting of a curved wire having a portion extended through the machine bed-plate, a tappet-finger upon the lower end of the ejector, and a rotary tappet-arm for engaging with said finger.

4. In a bending-machine, a bending and twisting mechanism, a clamping device forward thereof, an ejector mounted to swing transversely of the machine and having a portion extended through the machine bed-plate, a finger extended at an outward and downward curve from the lower end of the ejector, a wheel, and a spring-yielding arm carried by the wheel for engaging with said finger.

5. In a bending-machine, a bending and twisting mechanism, a clamping device forward thereof, an ejector mounted to swing transversely of the machine and having a portion extended through the machine bed-plate, a finger extended at an outward and downward curve from the lower end of the ejector, a wheel, a rack mechanism for operating said wheel, and a spring-yielding arm carried by the wheel for engaging with said finger.

6. In a wire-loop-forming machine, a bending and twisting head, a clamping device forward thereof, an ejector consisting of curved wire having a portion extended through the machine bed-plate, a tappet-finger on the lower end of the ejector, a rotary tappet-arm for engaging with said finger, and a receiver for the wires.

7. In a wire-loop-forming machine, a driving-shaft, a bending and twisting head mounted thereon, means for holding a wire while bending and twisting, a collar mounted on said sleeve, a pin slidable in said collar, a pulley loosely mounted on the shaft and adapted for locking engagement with said pin, and an automatically-actuated device for moving the pin out of engagement with the pulley.

8. In a wire-loop-forming machine, a shaft, a bending and twisting head on said shaft, a driving-pulley loosely mounted on the shaft, a sprocket connected to said pulley, a lower shaft, a sprocket-wheel loosely mounted on said lower shaft, driving connections between the two sprockets, an automatically-controlled clutch for engaging the lower shaft, with the sprocket-wheel thereon and disengaging the same, a clutch mechanism between the first-named shaft and the driving-pulley thereon, and means actuated by the lower shaft for controlling said clutch mechanism.

9. In a wire-loop-forming machine, a shaft, a bending and twisting head on said shaft, a lower shaft, a driving-gear loosely mounted on said lower shaft, driving connections between said pulley and said driving-gear, a collar on the lower shaft, a spring-pressed pin movable in said collar, devices on said gear-wheel for engaging with said pin, and devices controlled by movements of the driving-pulley for moving said pin in one direction.

10. A wire-loop-forming machine comprising an upper shaft, a bending and twisting head on said shaft, a driving-pulley loosely mounted on the shaft, means for operatively connecting said pulley and shaft, a lower shaft, a bend-forming device operated from said lower shaft, a driving-gear loosely mounted on said lower shaft and having driving connection with the driving-pulley, a collar mounted on the lower shaft, a spring-pressed pin movable in said collar, and adapted for locking engagement with the gear-wheel on the lower shaft, a blade for engaging with said pin to move it out of its clutch connection, a swinging lever carrying said blade, a shaft arranged above the bed of the machine, a wheel on said shaft having pins for actuating said lever, a ratchet-wheel on said shaft, a disk carried by the shaft and having a notch in its periphery and a curved cam projection on its face opposite the notch, a lever actuated by rotary movements of the driving-pulley, a pawl carried by said lever and engaging with the ratchet-wheel, a pawl-lever mounted to swing on said actuating-lever and adapted to engage with the disk, and in the notch thereof, and a detent for temporarily holding the pawl-lever in inoperative position, said detent being moved out of said engagement with the pawl-lever by a cam carried on the disk.

11. In a wire-loop-forming machine, a main shaft, a driving and twisting head on said shaft, a bend-forming pin movable in said head, a lower shaft, means actuated from said lower shaft for actuating said pin, a driving-pulley loosely mounted on the main shaft, a gear-wheel loosely mounted on the lower shaft, a clutch for connecting said lower shaft to the gear-wheel, means actuated from movements of the driving-pulley for actuating said clutch, a clutch connection between the main shaft and the driving-pulley, and means actuated from said lower shaft for controlling said clutch.

12. A wire-loop-forming machine comprising an upper shaft, a lower shaft, a bending and twisting head on the upper shaft, means controlled from the lower shaft for actuating said upper shaft and head, means for stopping the machine after forming a predetermined number of loops, and means for alternately stopping and starting the machine.

13. In a machine of the character described, a shaft, a driving-wheel loosely mounted thereon, a collar on the shaft and having a longitudinal opening, a spring-pressed pin movable in said opening and adapted for locking engagement with the driving-gear, the said pin being provided with a notch, a curved blade, and means for automatically actuating said blade to engage in said notch, and draw the pin out of its clutch engagement.

14. In a machine of the character described, a main shaft, a turning and twisting head carried by the shaft, a lower shaft for controlling the bending mechanism, a driving-pulley loosely mounted on the main shaft, means controlled by the lower shaft for locking said pulley to the main shaft, a driving-wheel loosely mounted on the lower shaft and having driving connection with the pulley, and means controlled by the pulley for locking said driving-wheel in connection with the lower shaft.

15. In a machine of the character described, a main shaft, means for causing an intermittent rotary motion of said shaft, a bending and twisting head carried by the shaft, the said head comprising a plate having an angular slot, a collar movable on the shaft, a pin extended through the said slot, link connections between said pin and collar, a lug on the plate below said slot, an angle-lever having connection with said collar, a swinging arm at the lower portion of the machine, a rod connection between said angle-lever and said arm, an intermittently-rotated lower shaft, and a cam operated by said lower shaft for causing movements of said arm to move the collar in opposite directions.

16. In a machine of the character described, a main shaft, a bending and twisting head on said shaft, a bending device operating in said head, a lower shaft for operating said bending device, a clamping device actuated from said lower shaft, a sprocket-wheel loosely mounted on the lower shaft, a driving-pulley loosely mounted on the main shaft, means for automatically causing a clutch connection between said driving-pulley and its shaft, a driving connection between said pulley and the sprocket-wheel, a clutch connection between the lower shaft and the sprocket-wheel, the said clutch comprising a longitudinally-movable pin, a blade for moving said pin in one direction, a swinging lever carrying said blade and extended upward through the bed-plate of the machine, a shaft, a disk on said shaft, pins on said disk for causing swinging movements of said lever, a ratchet-wheel on said shaft, a disk mounted on said shaft and having a peripheral notch and a surface cam projection, a lever moved in one direction by said driving-pulley, a pawl carried by said lever and engaging with the ratchet-wheel, a pawl-lever mounted on the actuating-lever, a dog engaging with the ratchet-wheel and having spring connection with the pawl-lever, a detent for the pawl-lever comprising a resilient portion having an extended finger for engaging with the cam on the disk and having a bent finger for engaging with the lower end of the pawl-lever, and an eccentric for throwing said actuating-lever out of operative position.

17. In a machine for the purpose described, a main shaft, a twisting and bending head carried by said shaft, a lower shaft, means actuated by said lower shaft for actuating the bending mechanism, a driving-pulley loosely mounted on the main shaft, a driving-gear loosely mounted on the lower shaft, connections between said pulley and gear, a clutch for connecting the main shaft with the driving-pulley, means for automatically controlling said clutch, a clutch for connecting the driving-gear with the lower shaft, a shaft forward of the main shaft, means actuated by said forward shaft for controlling the clutch connection between the lower shaft and the driving-gear thereon, a ratchet-wheel on said forward shaft, a lever actuated from said driving-pulley for imparting step-by-step motion to said ratchet-wheel, a cam-disk carried by said forward shaft and having a peripheral notch, a pawl-lever carried by said actuating-lever, a detent for holding said pawl-lever out of engagement temporarily with the cam-disk, a cam on the cam-disk for moving the detent out of engagement with the lever, another ratchet-wheel mounted on said shaft and having a greater number of teeth than the first-named ratchet-wheel, a pawl engaging with the last-named ratchet-wheel, and means controlled by the main and lower shafts for causing movements of said pawls.

18. In a wire-loop-forming machine, the combination with a main shaft and a lower shaft, a driving-pulley loosely mounted on the main shaft, a driving-wheel loosely mounted on the lower shaft and having driving connection with the pulley, means controlled by the lower shaft for locking the driving-pulley to the main shaft, a shaft forward of the main shaft, means controlled by said forward shaft for locking the lower shaft to the driving-wheel thereon, a ratchet-wheel on said front shaft, means operated by the driving-pulley for imparting a step-by-step motion to said ratchet-wheel, another ratchet-wheel mounted on said forward shaft and having a greater number of teeth than the first-named ratchet-wheel, a spring-pressed pawl engaged with the other ratchet-wheel, a swinging arm carrying said pawl, a rocker-arm with which said swinging arm has link connection, a roller carried by said arm, a roller carried by the main shaft and having a peripheral notch to receive the roller carried by the said arm, a rocker-arm at the lower portion of the machine, a roller carried by said lower rocker-arm, a roller carried by the lower shaft and having a notch to receive the roller on the lower arm, a rod connection between the two rocker-arms, and a spring for moving said rocker-arms upward.

19. In a wire-loop-forming machine, a bending and twisting mechanism, a clamping mechanism forward thereof, an ejector consisting of resilient wire, a hanger on which the ejector is mounted to swing, a curved finger on the lower end of the ejector, a disk, a pinion on the shaft of said disk, an automatically-actuated rack engaging with said pinion, a tappet-arm mounted to swing on the disk, a spring connection between the arm and disk, and a pin on the disk for engaging with the arm to hold it rigidly when moving in one direction.

20. In a wire-loop-forming machine, a main shaft, a bending and twisting head on the shaft, a bending device movable in the head, a swinging arm mounted in the machine-frame, an operating connection between said arm and said bending device, a clamping device comprising a swinging member, an operating connection between said member and said arm, an intermittently-actuated lower shaft, and a cam carried by said lower shaft for controlling the swinging arm.

21. In a wire-loop-forming machine, a main shaft, a bending and twisting head on the shaft, a bending device movable in the head, a swinging arm mounted in the machine-frame, an operating connection between said arm and said bending device, a clamping device comprising a swinging member, an operating connection between said member and said arm, an ejector controlled from said arm, an intermittently-actuated lower shaft, and a cam carried by said lower shaft for controlling the swinging arm.

22. In a wire-loop-forming machine, a main shaft, a bending and twisting head carried by said shaft, a pulley loosely mounted on the shaft, a lower shaft, a sprocket-wheel on the lower shaft having a driving connection with the pulley, the said sprocket-wheel being loose, a clutch mechanism for engaging the lower shaft with the wheel and comprising a pin, means controlled from the driving-pulley for moving said pin in one direction, a peripherally-notched disk on the lower shaft for controlling the movements of the pin in opposite directions, a clutch connection between the main shaft and the driving-pulley, and a peripherally-notched disk on the lower shaft for moving said clutch connection in one direction.

23. In a wire-loop-forming machine, a bending and twisting mechanism, a wire-clamping device, an ejector operating adjacent to the clamping device, and a wire-receiver consisting of a metal bar curved downward and outward and having its upper end terminating over the clamping device.

In testimony whereof I have signed my name to this specification in the presence of two subscribing witnesses.

HENRY P. WILSON.

Witnesses:
CHAS. T. MUIR,
H. S. BARTON.